United States Patent
Okita

(10) Patent No.: US 9,164,355 B2
(45) Date of Patent: Oct. 20, 2015

(54) LIGHT CONTROL APPARATUS

(71) Applicant: OLYMPUS CORPORATION, Tokyo (JP)

(72) Inventor: Tatsuhiko Okita, Akiruno (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/539,204

(22) Filed: Nov. 12, 2014

(65) Prior Publication Data

US 2015/0071629 A1 Mar. 12, 2015

Related U.S. Application Data

(63) Continuation of application No. PCT/JP2013/061383, filed on Apr. 17, 2013.

(30) Foreign Application Priority Data

May 24, 2012 (JP) ................................. 2012-118847

(51) Int. Cl.
*G03B 9/02* (2006.01)
*G02B 26/02* (2006.01)

(52) U.S. Cl.
CPC *G03B 9/02* (2013.01); *G02B 26/02* (2013.01); *G03B 2205/0069* (2013.01)

(58) Field of Classification Search
CPC ............... G03B 9/00; G03B 9/02; G03B 9/04
See application file for complete search history.

(56) References Cited

U.S. PATENT DOCUMENTS

| | | | | |
|---|---|---|---|---|
| 6,612,755 | B1 * | 9/2003 | Kamata | 396/458 |
| 8,797,626 | B2 * | 8/2014 | Naruse | 359/234 |
| 2010/0166416 | A1 * | 7/2010 | Okita | 396/449 |
| 2010/0181463 | A1 * | 7/2010 | Ide | 250/205 |
| 2013/0258434 | A1 * | 10/2013 | Okita | 359/230 |
| 2015/0071629 | A1 * | 3/2015 | Okita | 396/505 |

FOREIGN PATENT DOCUMENTS

JP 2001-215599 * 8/2001 ............... G03B 9/04

OTHER PUBLICATIONS

English translation of International Preliminary Report on Patentability together with the Written Opinion dated Dec. 4, 2014 received in related International Application No. PCT/JP2013/061383.

* cited by examiner

*Primary Examiner* — W B Perkey
(74) *Attorney, Agent, or Firm* — Scully, Scott, Murphy & Presser, PC

(57) ABSTRACT

Incident light that passes through the optical aperture is controlled by pivoting the light control unit (130) alternately to a first stationary position of being retracted from the optical aperture (102 and 122), and a second stationary position of overlapping with the optical aperture by moving the light control unit by the drive unit (132 and 150), and when the light control unit is at the first stationary position, the light control unit is capable of sticking out of the first substrate and the second substrate.

2 Claims, 7 Drawing Sheets

LIGHT CONTROL APPARATUS

CROSS-REFERENCE TO RELATED APPLICATIONS

The present application is a continuation application of International application No. PCT/JP2013/061383 filed on Apr. 17, 2013, which is based upon and claims the benefit of priority from the prior Japanese Patent Application No. 2012-118847 filed on May 24, 2012; the entire contents of these applications are incorporated herein by reference.

BACKGROUND OF THE INVENTION

1. Field of the Invention

The present invention relates to a light control apparatus.

2. Description of the Related Art

In recent years, with improved high-quality performance of a portable equipment having an image pickup function, and a small-size optical apparatus such as a micro video scope, with regard to optical elements such as a lens, an aperture, and an optical filter, there has been an increasing requirement of an application of optical elements such and an adjustable focus lens, a variable aperture, a variable optical filter, as well as other optical elements, instead of a fixed focus lens and a fixed aperture stop. Moreover, further small-sizing (slimming) of such optical elements has been sought.

For instance, in a blade driving apparatus described in Japanese Patent Application Laid-open Publication No. 2010-96872, an adjustment of amount of light is carried out by forming a plurality of optical apertures in one blade. In this blade driving apparatus, since there is no need to use a plurality of blades, small-sizing is possible.

SUMMARY OF THE INVENTION

A light control apparatus according to the present invention includes, a first substrate and a second substrate, each having an optical aperture formed therein, at least one light control unit, a spacer which is disposed between the first substrate and the second substrate, and which forms a space for the light control unit to move, and a drive unit which moves the light control unit disposed on the first substrate, and incident light that passes through the optical aperture is controlled by pivoting the light control unit alternately to a first stationary position of being retracted from the optical aperture, and a second stationary position of overlapping with the optical aperture by moving the light control unit by the drive unit, and when the light control unit is at the first stationary position, the light control unit is capable of sticking out of the first substrate and the second substrate.

It is preferable that the light control apparatus according to the present invention further includes a protruding portion which has an abutting portion, and when the light control unit is at the first stationary position, the light control unit abuts with the abutting portion.

In the light control apparatus according to the present invention, it is preferable that the protruding portion is a portion which is formed by at least one of the first substrate and the second substrate sticking out in an in-plane direction which is perpendicular to an optical axis of the light control apparatus.

It is preferable that the light control apparatus according to the present invention has a frame member, and a part of the frame member sticks out in the in-plane direction.

In the light control apparatus according to the present invention, it is preferable that a notch is formed in the first substrate and the second substrate, and the frame member includes a regulating portion which prevents the light control unit inserted into the notch from falling.

DETAILED DESCRIPTION OF THE INVENTION

Exemplary embodiments of a light control apparatus according to the present invention will be described below in detail by referring to the accompanying diagrams. However, the present invention is not restricted to the embodiments described below.

First Embodiment

Figure 1:
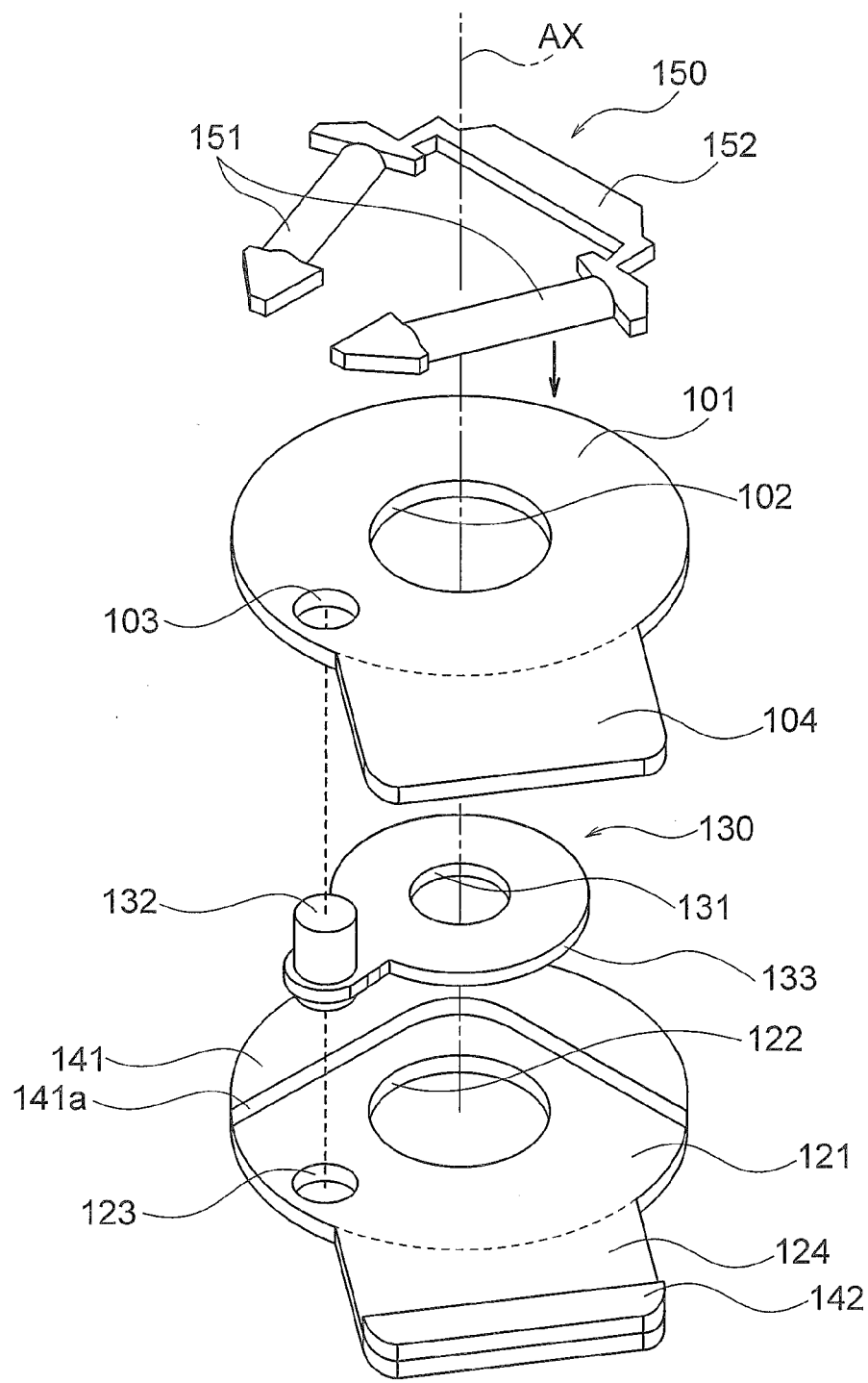
FIG. 1 is an exploded perspective view showing an arrangement of a light control apparatus according to a first embodiment of the present invention.
Figure 2:
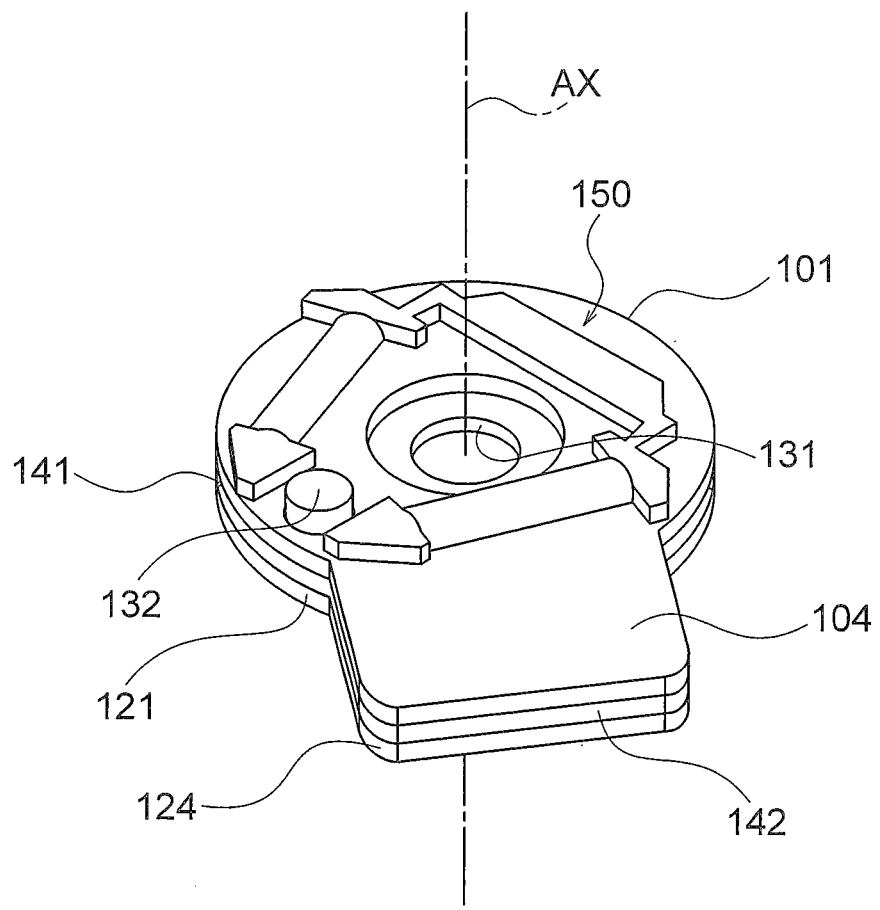
FIG. 2 is a perspective view showing the light control apparatus according to the first embodiment in an assembled state.

A light control apparatus according to a first embodiment of the present invention will be described below by referring to diagrams from FIG. 1 to FIG. 4B. FIG. 1 is an exploded perspective view showing an arrangement of a light control apparatus according to the first embodiment. FIG. 2 is a perspective view showing the light control apparatus according to the first embodiment in an assembled state.

The light control apparatus shown in FIG. 1 includes a first substrate 101, a protruding portion 104, a second substrate 121, a protruding portion 124, a light control unit 130 which is disposed between the first substrate 101 and the second substrate 121, a spacer 141, an abutting portion 142 (stopper), and an electromagnetic drive source 150 which is disposed on the first substrate 101, and which turns the light control unit 130.

An optical aperture 102, a rotating-shaft hole 103, and the protruding portion 104 are formed in the first substrate 101. An optical aperture 122, a rotating-shaft hole 123, and the protruding portion 124 are formed in the second substrate 121. An optical aperture 131 is formed in the light control unit 130.

The first substrate 101 and the second substrate 121 are disposed in order along an optical axis AX such that the optical aperture 102 provided at a center of the first substrate 101 and an optical aperture 122 provided at a center of the second substrate 121 are positioned coaxially with respect to the optical axis AX of the apparatus.

The protruding portion 104 of the first substrate 101 is a portion which is formed integrally to protrude outward in a radial direction from an outer circumference of the first substrate 101 which is substantially circular-shaped in a plan view. The protruding portion 124 of the second substrate 121, similarly as the protruding portion 104 of the first substrate 101, is a portion which is formed integrally to protrude outward in a radial direction from an outer circumference of the second substrate 121. The protruding portion 104 of the first substrate 101 and the protruding portion 124 of the second substrate 121 are provided at positions facing mutually, and a planar shape thereof is substantially same.

A rotating-shaft member 132, which is magnetic, is provided directly at a center of rotation of the light control unit 130. For the rotating-shaft member 132 to be extended along the optical axis AX, a lower end portion of the rotating-shaft member 132 is rotatably fitted into the rotating-shaft hole 123 of the second substrate 121, and an upper end portion of the rotating-shaft member 132 is inserted through the rotating-shaft hole 103 of the first substrate 101. The light control unit 130 is turned with the rotating-shaft member 132 as a center, and accordingly, the optical aperture 131 functions as an optical diaphragm. Here, instead of the optical aperture 131, it is also possible to provide a lens or a filter to the light control unit 130. Moreover, the light control unit 130 may be provided in plurality.

The electromagnetic drive source 150 is a drive source is which, two winding coil portions 151 are provided to a yoke member 152 having a substantial C-shape. Two front-end portions of the yoke member 152 are face-to-face mutually, sandwiching the rotating-shaft member 132 in between.

The electromagnetic drive source 150 and the rotating-shaft member 132 constitute a drive unit. The light control unit 130 is driven by the drive unit. More elaborately, as a predetermined electric current is applied to the winding coil portions 151, the rotating-shaft member 132 disposed between the two front-end portions of the yoke member 152 is turned around the axis thereof. With the turning of the rotating-shaft member 132, the light control unit 130 is pivoted alternately to a first stationary position and a second stationary position in a plane perpendicular to a direction of the optical axis AX, with the rotating-shaft member 132 as a center of rotation. Accordingly, a position of the optical aperture 131 changes, and incident light that passes through the optical aperture of the light control apparatus is controlled.

Figure 3A:
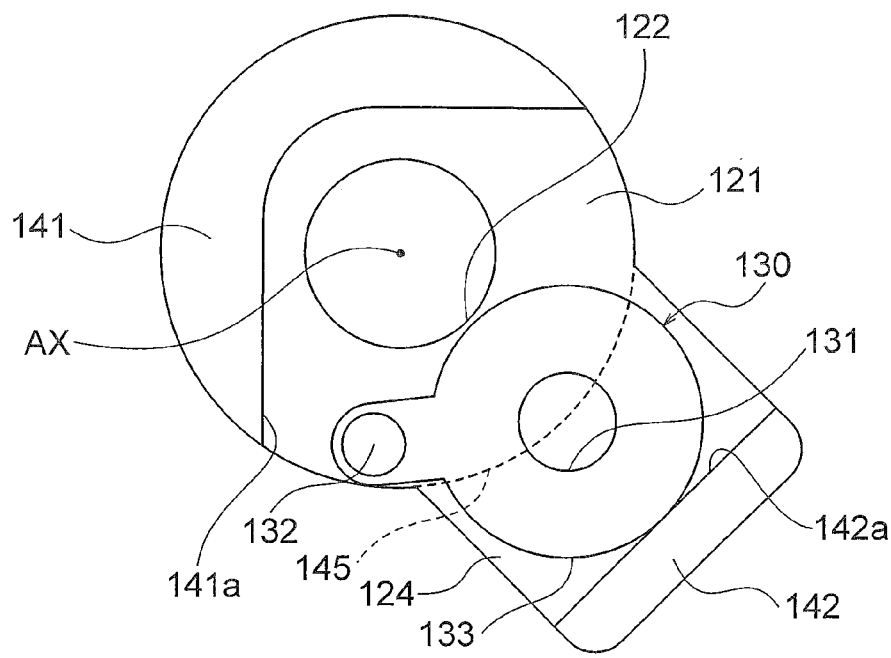
FIG. 3A is a plan view showing a state in which, a light control unit in the first embodiment is at a first stationary position.
Figure 3B:
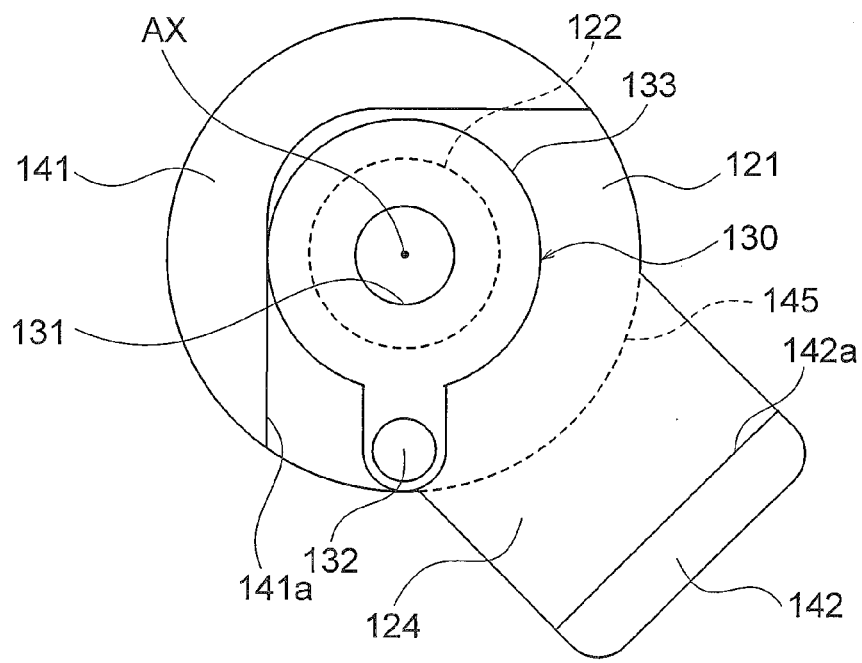
FIG. 3B is a plan view showing a state in which, the light control unit in the first embodiment is at a second stationary position.

The spacer 141 is disposed between the first substrate 101 and the second substrate 121, and forms a space which enables the light control unit 130 to turn. Moreover, in the spacer 141, an inner surface 141a is formed at a position at which, an outer peripheral surface 133 of the light control unit 130 that has pivoted to the second stationary position at which, the optical aperture 131 overlaps to be coaxially with the second substrate 121 (FIG. 3A and FIG. 3B). By stopping the turning of the light control unit 130 by making the outer peripheral surface 133 abut with the inner surface 141a, the optical aperture 131 of the light control unit 130 and the optical aperture 122 of the second substrate 121 are disposed coaxially assuredly.

The abutting portion 142 is disposed between an area of the two protruding portions 104 and 124 which are face-to-face mutually.

How the light control unit 130 is capable of sticking out of the first substrate 101 and the second substrate 121 will be described below more specifically.

When the optical aperture 131 has retracted from the second substrate 121 upon turning of the light control unit 130, and is disposed at the first stationary position, the light control unit 130, when viewed from the direction of the optical axis AX, sticks out of a virtual outer circumferential line 145 of the first substrate 101 and the second substrate 121. At this time, the outer peripheral surface 133 of the light control unit 130 abuts with an inner surface 142a of the abutting portion 142 (FIG. 3A).

The abutting portion 142, apart from using as a stopper regulating the turning of the light control unit 130, can also be made to function as a spacer similarly as the spacer 141.

In an example shown in FIG. 1, the abutting portion 142 has been disposed on the protruding portion 124 of the second substrate 121. However, the abutting portion 142 may also be disposed toward the first substrate 101, or may also be formed integrally with the first substrate 101 or the second substrate 121.

Next, an operation of the light control apparatus according to the first embodiment will be described below, using FIGS. 3A and 3B. FIG. 3A is a plan view showing a state in which, the light control unit 130 is at the first stationary position, and FIG. 3B is a plan view showing a state in which, the light control unit 130 is at the second stationary position. In FIG. 3A and FIG. 3B, in order to show the movement of the light control unit 130 clearly, the first substrate 101 and the electromagnetic drive source 150 are not shown in the diagram.

As shown in FIG. 3A, when the light control unit 130 is at the first stationary position to which, the optical aperture 102 of the first substrate 101 and the optical aperture 122 of the second substrate 121 are retracted, the light control unit 130 sticks out into a space sandwiched between the protruding portion 104 of the first substrate 101 and the protruding portion 124 of the second substrate 121, and abuts with the inner surface 142a of the abutting portion 142, and comes to rest at that position. To put in other words, the light control unit 130 sticks out of the virtual circumferential line 145 of the first substrate 101 and the second substrate 121. At this time, the optical aperture 102 formed in the first substrate 101 or the optical aperture 122 formed in the second substrate 121 becomes the optical aperture of the light control apparatus.

In an example shown in FIG. 3A and FIG. 3B, the light control unit 130 which is at the first stationary position, sticks out into the space sandwiched between the protruding portion 104 of the first substrate 101 and the protruding portion 124 of the second substrate 121. However, if the light control unit 130 is capable of sticking out of the first substrate 101 and the optical aperture 102, an arrangement may be without the two protruding portions 104 and 124 provided thereto.

As shown in FIG. 3B, when the light control unit 130 is at the second stationary position of overlapping with the optical aperture 102 of the first substrate 101 and the optical aperture 122 of the second substrate 121, the light control unit 130 abuts with the spacer 141, and comes to rest at that position. In this state, the optical aperture 131 formed in the light control unit 130 becomes the optical aperture of the light control apparatus.

The light control apparatus according to the first embodiment is characterized by an arrangement provided with the protruding portion 104 provided to the first substrate 101, the protruding portion 124 provided to the second substrate 121, and the abutting portion 142 disposed between the protruding portion 104 and the protruding portion 124. Heretofore, in a case where, it is necessary to widen a space in which a light control unit moves (space for retraction) by making large a diameter of an optical aperture formed in a substrate or by making large an outer diameter of the light control unit, an increase in a size of a light control apparatus corresponding to the spreading of the space in which the light control unit moves, could not be avoided. However, in the light control apparatus according to the first embodiment, since the protruding portions 104 and 124 are provided to the first substrate 101 and the second substrate 121 respectively, corresponding only to the space in which the light control unit moves (is retracted), even when there is an increase in the space in which the light control unit moves, it is possible to suppress the size of the light control apparatus from becoming large.

Modified Example

Figure 4A:
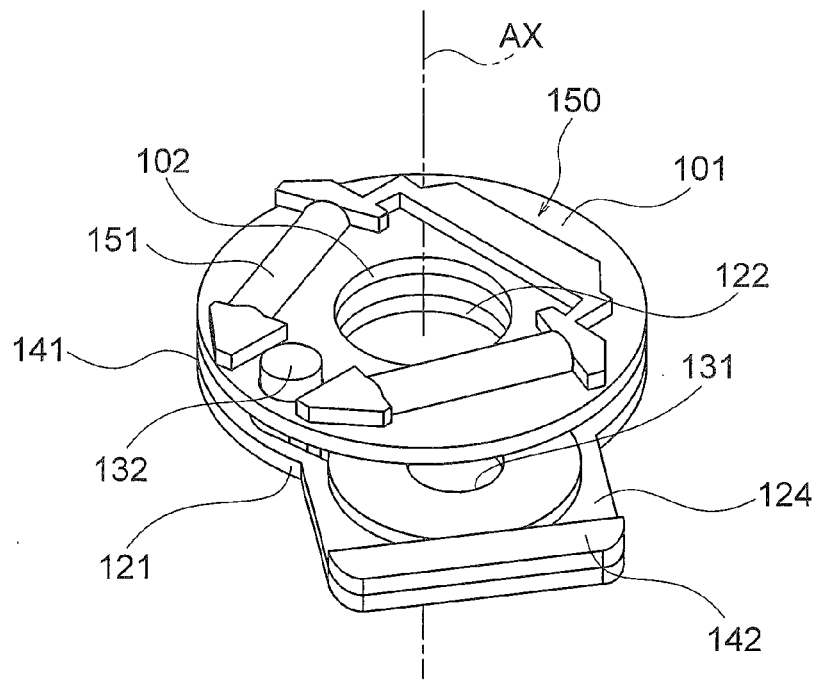
FIG. 4A is a perspective view showing a state in which, a light control unit is at a first stationary position in a modified example of the first embodiment.
Figure 4B:
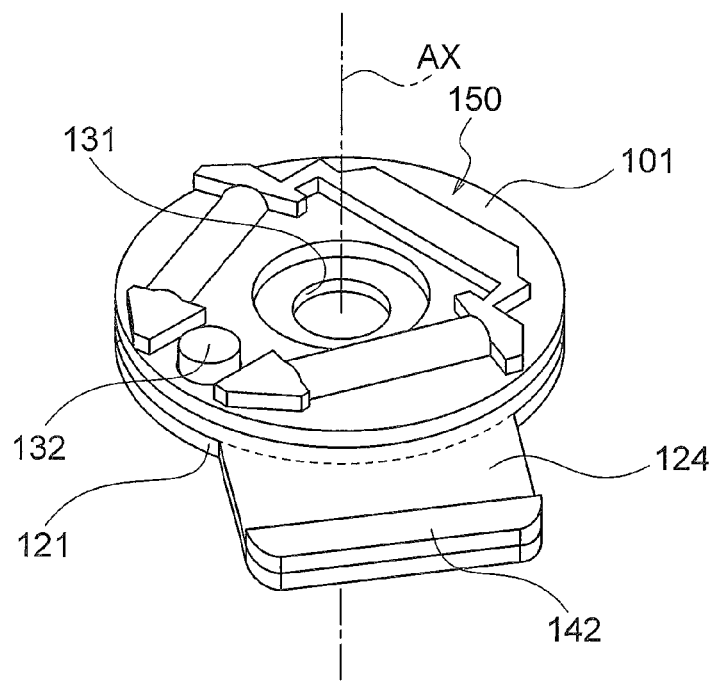
FIG. 4B is a perspective view showing a state in which, the light control unit is at a second stationary position.

FIG. 4A is a perspective view showing a state in which, a light control unit 130 is at a first stationary position, and FIG. 4B is a perspective view showing a state in which, the light control unit 130 is at a second stationary position in a modified example of the first embodiment.

In the light control apparatus according to the first embodiment shown in diagrams from FIG. 1 to FIG. 3B, the protruding portion is provided to both the first substrate 101 and the second substrate 121. However, in the modified example, as shown in FIG. 4A and FIG. 4B, no protruding portion is provided to the first substrate 101, and the protruding portion 124 is provided only to the second substrate 121. Even in this arrangement, an action and effect similar to the action and effect of the light control apparatus according to the first embodiment is achieved.

Instead of the modified example shown in FIG. 4A and FIG. 4B, an arrangement in which, no protruding portion is provided to the second substrate 121, and a protruding portion is provided only to the first substrate 101 is also possible, and it is possible to achieve a similar action and effect.

Second Embodiment

A light control apparatus according to a second embodiment differs from the light control apparatus according to the first embodiment at a point that notches 206 and 226 are provided to a first substrate 201 and a second substrate 221 respectively, and at a point that a frame member 260 is provided. In the following description, explanation in detail of members similar to the members in the first embodiment is omitted.

Figure 5:
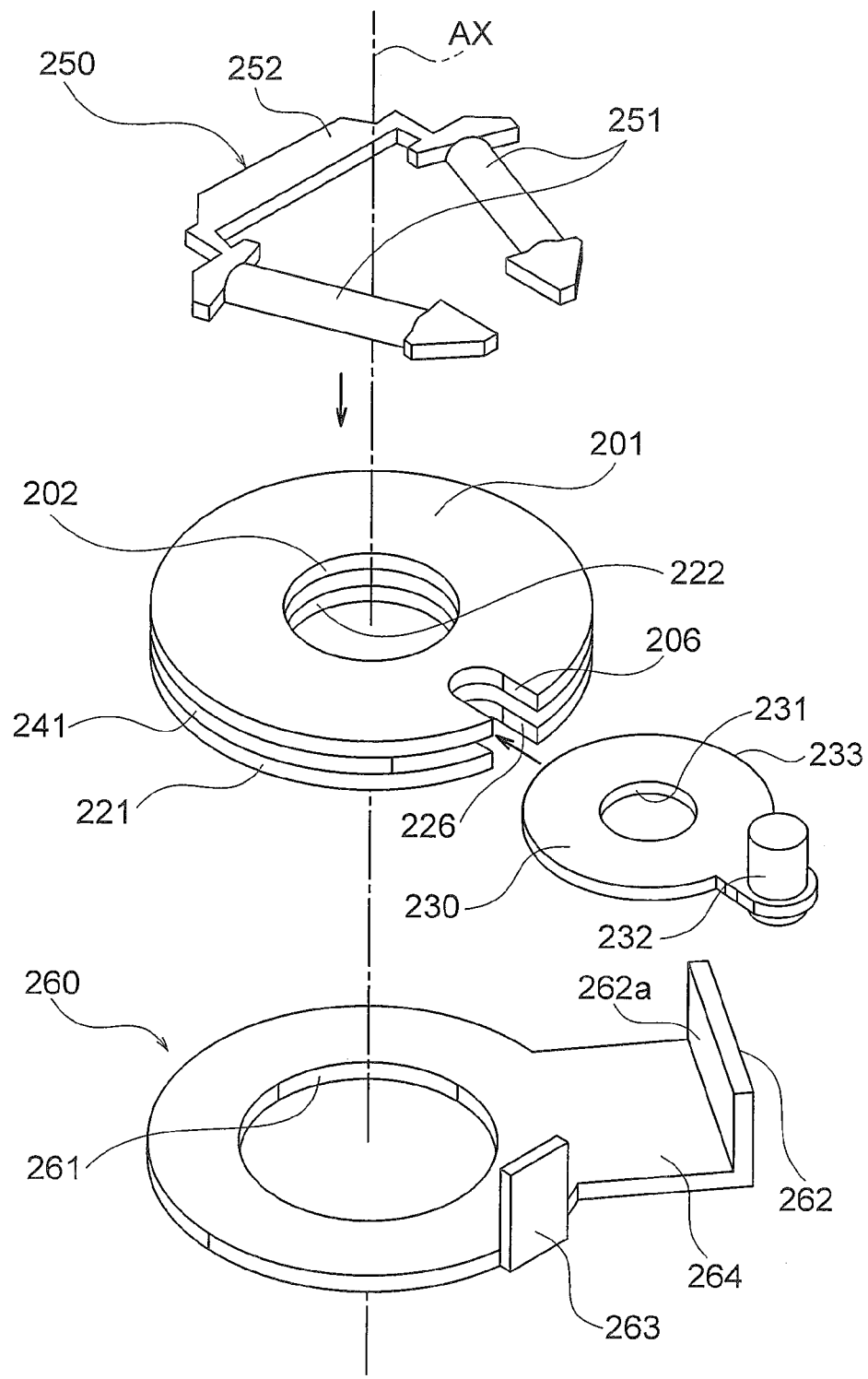
FIG. 5 is an exploded perspective view showing an arrangement of a light control apparatus according to a second embodiment of the present invention.
Figure 6A:
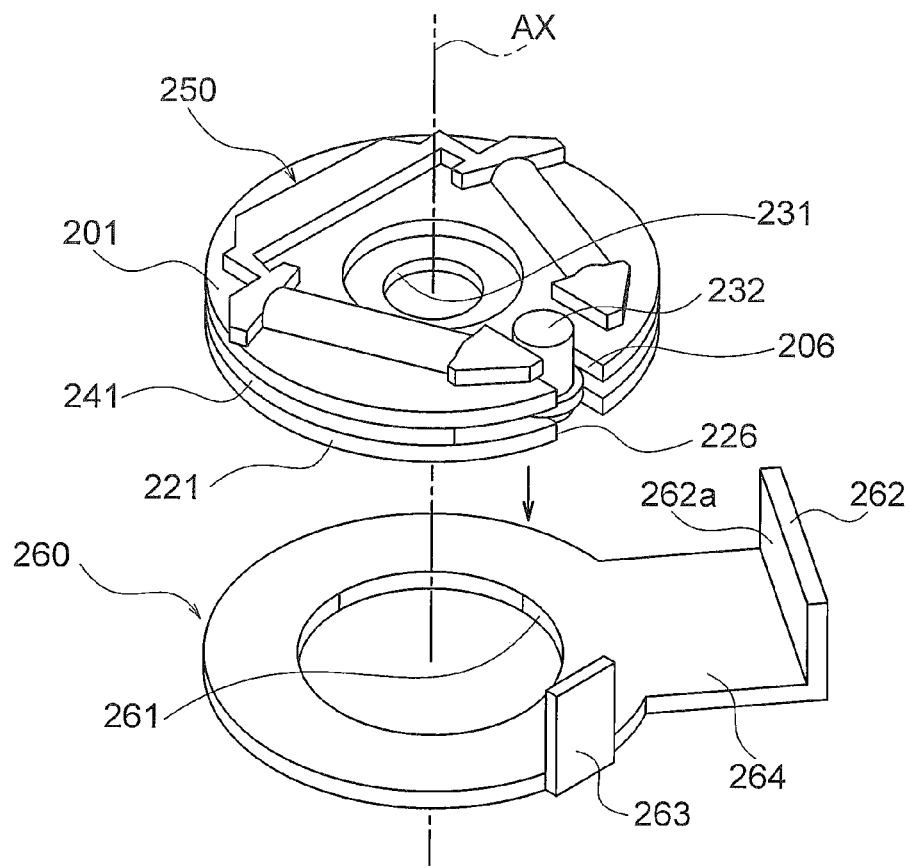
FIG. 6A is a perspective view showing how the light control apparatus according to the second embodiment is to be assembled.
Figure 6B:
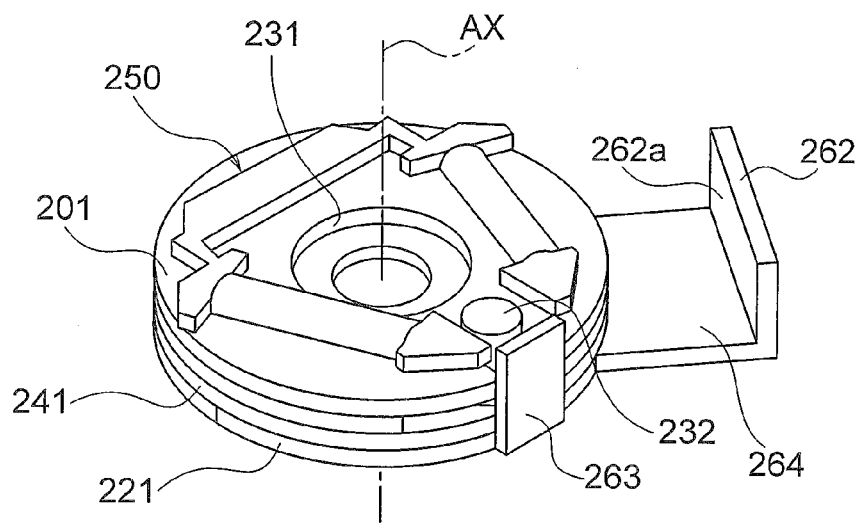
FIG. 6B is a perspective view showing an assembled state of the light control apparatus according to the second embodiment.
Figure 7A:
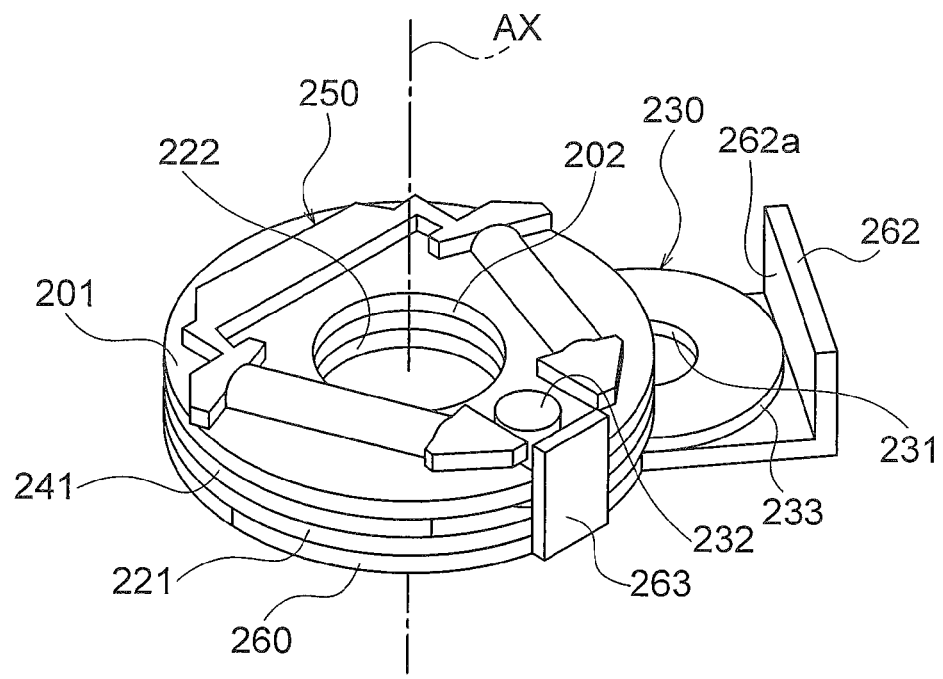
FIG. 7A is a perspective view showing a state in which, a light control unit in the second embodiment is at a first stationary position.
Figure 7B:
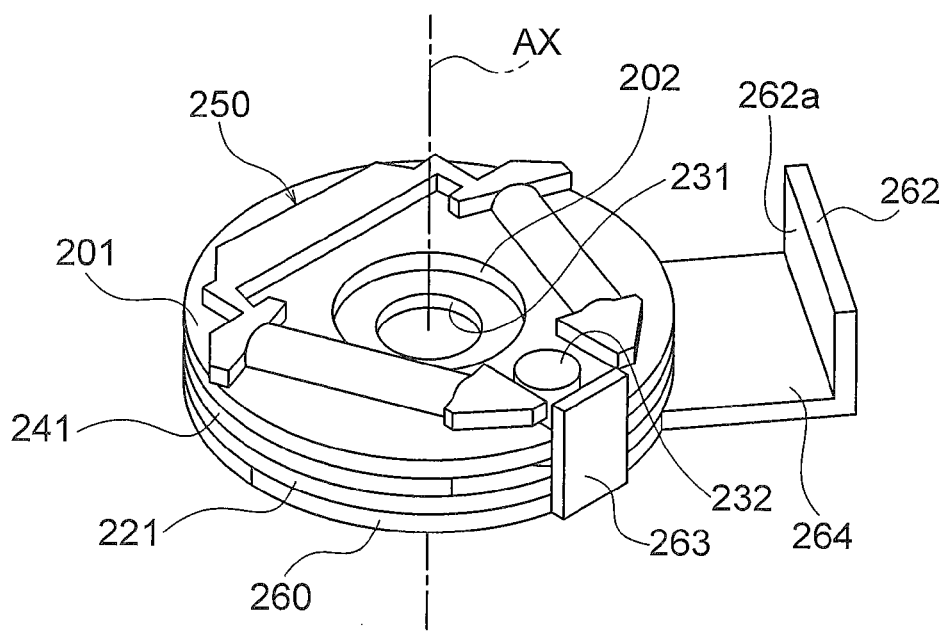
FIG. 7B is a perspective view showing a state in which, the light control unit in the second embodiment is at a second stationary position.

FIG. 5 is an exploded perspective view showing an arrangement of the light control apparatus according to the second embodiment. FIG. 6A is a perspective view showing how the light control apparatus according to the second embodiment is to be assembled, and FIG. 6B is a perspective view showing an assembled state of the light control apparatus according to the second embodiment. FIG. 7A is a perspective view showing a state in which, a light control unit 230 is at a first stationary position, and FIG. 7B is a perspective view showing a state in which, the light control unit is at a second stationary position.

The light control apparatus according to the second embodiment includes the first substrate 201, the second substrate 221, the light control unit 230 which is disposed between the first substrate 201 and the second substrate 221, a spacer 241, an electromagnetic drive source 250 which is disposed on the first substrate 201, and which turns the light control unit 230, and the frame member 260.

Optical apertures 202 and 222 are provided to the first substrate 201 and the second substrate 221 respectively, similarly as the first substrate 101 and the second substrate 121. The notches 206 and 226 in which, a rotating-shaft member 232 is pivotably fitted, are provided at mutually corresponding positions on an outer circumference of the first substrate 201 and on an outer circumference of the second substrate 221 respectively.

Here, the rotating shaft hole and the protruding portion which are provided to the first substrate 101 and the second substrate 102 of the first embodiment are not formed in the first substrate 201 and the second substrate 221.

The light control unit 230 includes an optical aperture 231 and the rotating-shaft member 232 corresponding to the rotating-shaft member 132 and the optical aperture 131 of the light control unit 130 of the first embodiment. The rotating-shaft member 232 is rotatably fitted into the notch 206 of the first substrate 210 and the notch 226 in the second substrate 221, to be extended along the optical axis AX. The light control unit 230 is pivoted with the rotating-shaft member 232 as a center, and accordingly, the optical aperture 231 functions as an aperture stop.

The light control unit 230, similarly as the light control unit 130 of the first embodiment, is driven and turned by the electromagnetic drive source 250.

The spacer 241 has an arrangement similar to the arrangement of the spacer 141 of the first embodiment, and is disposed between the first substrate 201 and the second substrate 221. The electromagnetic drive source 250 has an arrangement similar to the arrangement of the electromagnetic drive source 150 of the first embodiment, and is disposed on the first substrate 201. The electromagnetic drive source 250 includes winding coil portions 251 and a yoke member 252.

The frame member 260 includes an opening 261, an abutting portion 262 (stopper), and a regulating portion 263.

The opening 261 is formed to be circular-shaped with the optical axis AX as a center of the circle. The opening 261 has a diameter larger than a diameter of the optical apertures 202 and 222 formed in the first substrate 201 and the second substrate 221 respectively, and is not for adjusting an amount of light.

The abutting portion 262 is formed at an end portion of a protruding portion 264 that is protruded outward in radial direction from a position on the frame member 260, corresponding to the outer circumference of the first substrate 201 and the second substrate 221, and is extended toward the first substrate 201 along the optical axis AX.

The regulating portion 263 is formed at a position corresponding to the notch 206 of the first substrate 201 and the notch 226 of the second substrate 221, to be extended toward the first substrate 201 along the optical axis AX. By providing the regulating portion 263, it is possible to prevent falling of the rotating-shaft member 232 fitted into the notches 206 and 226.

In the light control apparatus of the second embodiment, firstly, the first substrate 201, the second substrate 221, and the spacer 241 are assembled, and thereafter, as shown in FIG. 6A, the light control unit 230 is inserted from side, into the notches 206 and 226 formed in the first substrate 201 and the second substrate 221 respectively. Subsequently, the frame member 260 is fitted from below as shown in FIG. 6B.

Here, the electromagnetic drive source 250 may be disposed before or after fitting the frame member 260.

Next, an operation of the light control apparatus of the second embodiment will be described below by referring to FIG. 7A and FIG. 7B.

When the light control unit 230 is at a first stationary position of being retracted from the optical aperture 202 of the first substrate 201 and the optical aperture 222 of the second substrate 221 as shown in FIG. 7A, an outer peripheral surface 233 of the light control unit 230 abuts with an inner surface 262a of the abutting portion 262 formed on the frame member 260 (FIG. 5), and comes to rest at that position. At this time, the optical aperture 202 formed in the first substrate 201 and the optical aperture 222 formed in the second substrate 221 become the optical aperture of the light control apparatus.

Whereas, when the light control unit 230 is at a second stationary position overlapping with the optical aperture 202 of the first substrate 201 and the optical aperture 222 of the second substrate 221 as shown in FIG. 7B, the light control unit 230 abuts with the spacer 241 and comes to rest at that position. In this state, the optical aperture 231 formed in the light control unit 230 becomes the optical aperture of the light control apparatus.

In the light control apparatus of the second embodiment, unlike in the light control apparatus of the first embodiment, there is no protruding portion and abutting portion on the first substrate 201 and the second substrate 221, but instead there is the frame member 260. The first stationary position to which the light control unit 230 has retracted, is regulated by the abutting portion 262 formed on the frame member 260.

According to the light control apparatus of the second embodiment, similarly as the light control apparatus of the first embodiment, by the light control unit 230 sticking out of the first substrate 201 and the second substrate 221 corresponding only to the space to which the light control unit is retracted (moved), it becomes possible to make the increase in the size of the apparatus as small as possible. In other words, even if the light control unit 230 is made to abut with the abutting portion 262 by using the frame member 260 which is a member different from the substrates, it is possible to achieve the effect same as the effect of the light control apparatus of the first embodiment.

Furthermore, in the light control apparatus of the second embodiment, an arrangement is such that the notches 206 and 226 are provided in the first substrate 201 and the second substrate 221 respectively, and the light control unit 230 is inserted into the notches 206 and 226. According to this arrangement, since there is no need to carry out position adjustment of the rotating-shaft member 132 and the rotating-shaft holes 103 and 123 in the substrate at the time of assembling as in the light control apparatus of the first embodiment, the assembling becomes easy. On the other hand, for preventing the light control unit 230 from falling, the regulating portion 263 has been provided to the frame member 260.

Rest of the arrangement, action, and effect are similar as in the first embodiment.

As described heretofore, the light control apparatus according to the present invention is useful in a case of increasing the space in which, the light control unit moves in a small-size apparatus.

The light control apparatus according to the present invention shows an effect that it is possible to suppress a size of the light control apparatus as a whole from becoming large even when there is an increase in a space in which, the diaphragm blade moves.

What is claimed is:

1. A light control apparatus comprising:
a first substrate and a second substrate, each having an optical aperture formed therein:
at least one light control unit;
a spacer which is disposed between the first substrate and the second substrate, and which forms a space for the light control unit to move;
a drive unit which moves the light control unit disposed on the first substrate, and
a protruding portion which has an abutting portion, wherein
when the light control unit is at the first stationary position, the light control unit abuts with the abutting portion;
incident light that passes through the optical aperture is controlled by pivoting the light control unit alternately to a first stationary position of being retracted from the optical aperture, and a second stationary position of overlapping with the optical aperture, by moving the light control unit by the drive unit;
when the light control unit is at the first stationary position, the light control unit is capable of sticking out of the first substrate and the second substrate; and
the protruding portion is a portion which is formed by at least one of the first substrate and the second substrate sticking out in an in-plane direction which is perpendicular to an optical axis of the light control apparatus.

2. A light control apparatus comprising:
a first substrate and a second substrate, each having an optical aperture formed therein:
at least one light control unit;
a spacer which is disposed between the first substrate and the second substrate, and which forms a space for the light control unit to move; and
a drive unit which moves the light control unit disposed on the first substrate,
wherein incident light that passes through the optical aperture is controlled by pivoting the light control unit alternately to a first stationary position of being retracted from the optical aperture, and a second stationary position of overlapping with the optical aperture, by moving the light control unit by the drive unit, and
wherein when the light control unit is at the first stationary position, the light control unit is capable of sticking out of the first substrate and the second substrate;
wherein the light control apparatus has a frame member, and a part of the frame member sticks out in the in-plane direction;
a notch is formed in the first substrate and the second substrate, and
the frame member includes a regulating portion which prevents the light control unit inserted into the notch from falling.

* * * * *